(12) United States Patent
Cheng et al.

(10) Patent No.: US 6,722,791 B2
(45) Date of Patent: Apr. 20, 2004

(54) MULTI-FIBER FERRULE

(75) Inventors: Yung-Chang Cheng, Tu-Chen (TW); Chin-Hsing Lee, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 1 day.

(21) Appl. No.: 10/126,843

(22) Filed: Apr. 19, 2002

(65) Prior Publication Data

US 2003/0198442 A1 Oct. 23, 2003

(51) Int. Cl.[7] ................................................ G02B 6/36
(52) U.S. Cl. ........................................................ 385/83
(58) Field of Search ............................ 385/63, 65, 83, 385/68, 86, 88

(56) References Cited

U.S. PATENT DOCUMENTS

| | | | | |
|---|---|---|---|---|
| 5,909,526 A | * | 6/1999 | Roth et al. ..................... | 385/78 |
| 5,915,055 A | * | 6/1999 | Bennett et al. ................ | 385/59 |
| 5,920,670 A | * | 7/1999 | Lee et al. ...................... | 385/78 |
| 6,062,740 A | * | 5/2000 | Ohtsuka et al. ............... | 385/81 |
| 6,173,097 B1 | * | 1/2001 | Throckmorton et al. ...... | 385/59 |
| 6,386,768 B1 | * | 5/2002 | Yoon et al. .................... | 385/88 |
| 6,398,424 B1 | * | 6/2002 | Jin et al. ....................... | 385/83 |
| 6,439,780 B1 | * | 8/2002 | Mudd et al. ................... | 385/83 |

* cited by examiner

*Primary Examiner*—Tulsidas Patel
(74) *Attorney, Agent, or Firm*—Wei Te Chung

(57) ABSTRACT

A multi-fiber ferrule (5) includes a ceramic body (10) and a housing (20) for combining with the ceramic body. The ceramic body has a rectangular portion (101) and two opposing latches (102) extending therefrom. A plurality of through holes (103) and a pair of guide pin channels (105) are defined through the rectangular portion between the two opposing latches. The housing defines a cavity (201), a passageway (204) communicating with the cavity, and a pair of guide pin channels (205) corresponding to the guide pin channels of the ceramic body. A plurality of V-grooves 203 for mounting fibers is formed in a floor of the cavity. The plurality of V-grooves each aligns with a corresponding through hole.

12 Claims, 3 Drawing Sheets

MULTI-FIBER FERRULE

BACKGROUND OF THE INVENTION

1. Field of the Invention

The present invention relates to a multi-fiber ferrule used in optical fiber connectors for aligning optical fibers for connection with other fiber optical devices.

2. Description of Related Art

Optical signals are commonly transmitted in optical fibers, which provide efficient light channels through which the optical signals can pass. Recently, optical fibers have been used in various fields, including telecommunications, where light passing through an optical fiber is used to convey either digital or analog information. Efficient connection of individual fibers is necessary in most optical processing systems or networks to achieve the desired routing of the signals.

An optical fiber connector for connecting an optical fiber to another optical fiber of a fiber optical device usually includes an alignment ferrule. The optical fiber connector typically utilizes the precise dimensions of the alignment ferrule to precisely align the optical fiber therein with the optical fiber of the mating fiber optical device. Moreover, optical fiber connectors for connecting multiple fibers are increasingly necessary as greater bandwidth applications are needed. Such connectors usually use a multi-fiber ferrule to align fibers.

In multi-fiber ferrules, an array of fibers is generally mounted in a plurality of v-grooves, which are etched in a silicon block, in order to provide precise positioning of the fibers. However, mounting the silicon block within a housing and ensuring the proper alignment of two silicon blocks in two housings when they are mated is difficult. Also, silicon is a hard, brittle material which is difficult to polish and which is easily broken. U.S. Pat. No. 5,602,951 discloses a precision-molded MT ferrule, which is used to align two groups of mating fibers. However, the MT ferrule is made of a plastic material using injection molding. It is difficult to precisely control the micro parameters of the ferrule during manufacture of the ferrule. Furthermore, it is difficult to polish an end face of this plastic material.

It is thus desirable to provide an improved multi-fiber ferrule which overcomes the above problems.

SUMMARY OF INVENTION

An object of the present invention is to provide an improved multi-fiber ferrule having a ceramic body.

Another object of the present invention is to provide a ceramic body for optical connectors which provides good precision and multi-fiber connection.

A multi-fiber ferrule comprises a ceramic body and a housing for incorporating with the ceramic body.

The ceramic body has a rectangular portion and two opposing latches extending therefrom. A plurality of through holes and a pair of guide pin channels are defined in the rectangular portion between the two opposing latches.

The housing is formed using insert molding. The housing defines a cavity, a passageway communicating with the cavity, and a pair of guide pin channels. A plurality of V-grooves are defined in a floor at bottom of the cavity.

In assembly, the ceramic body is fixed to a tailor-made mold, liquid plastic is inserted into the mold, and is thereafter cooled to form the housing integrally secured with the ceramic body. The plurality of V-grooves each corresponds to a through hole. The guide pin channels of the housing each align with a guide pin channel of the ceramic body.

Other objects, advantages and novel features of the invention will become more apparent from the following detailed description when taken in conjunction with the accompanying drawings.

DETAILED DESCRIPTION OF THE INVENTION

Figure 1:
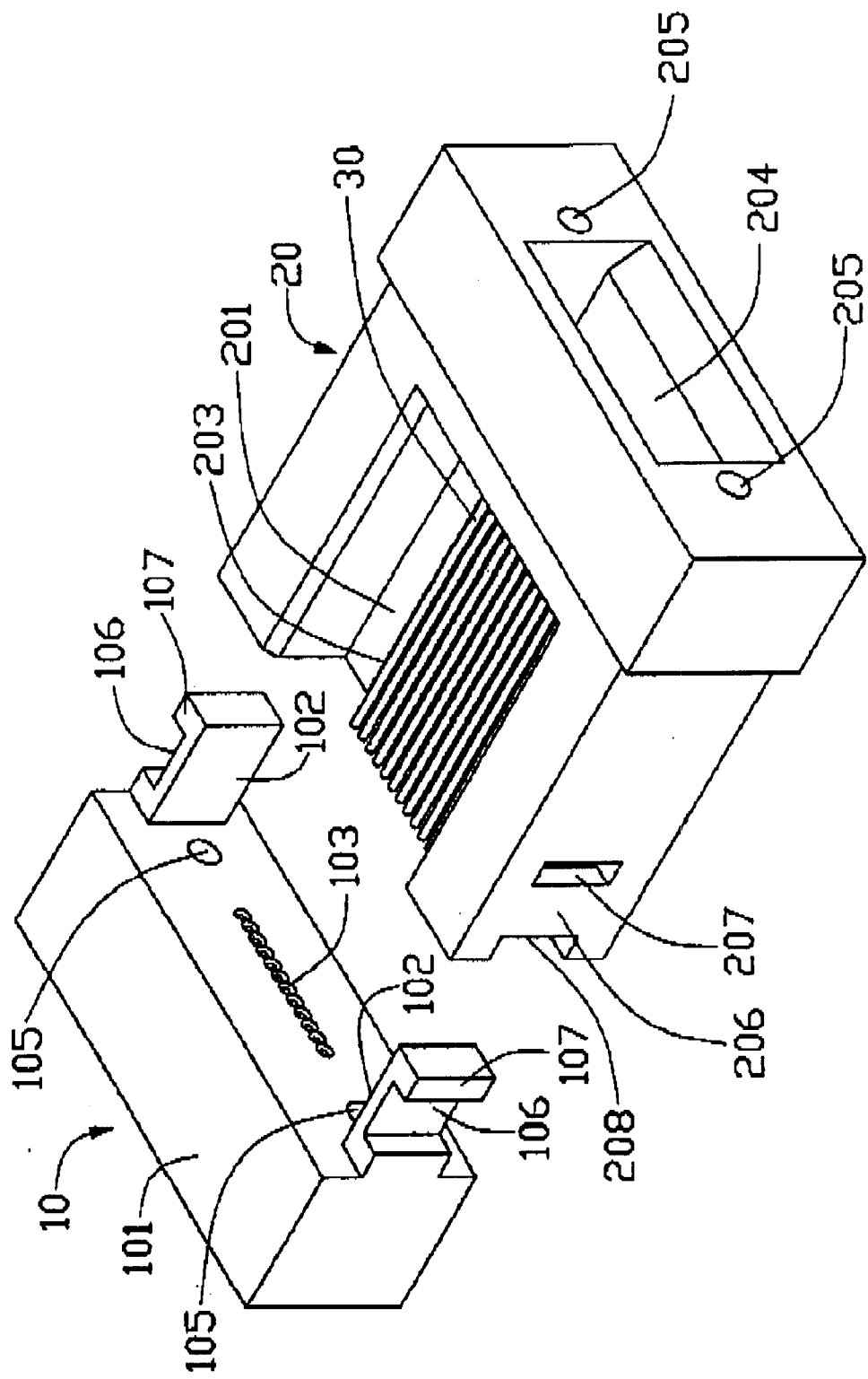
FIG. 1 is an exploded view of a multi-fiber ferrule according to the present invention.
Figure 2:
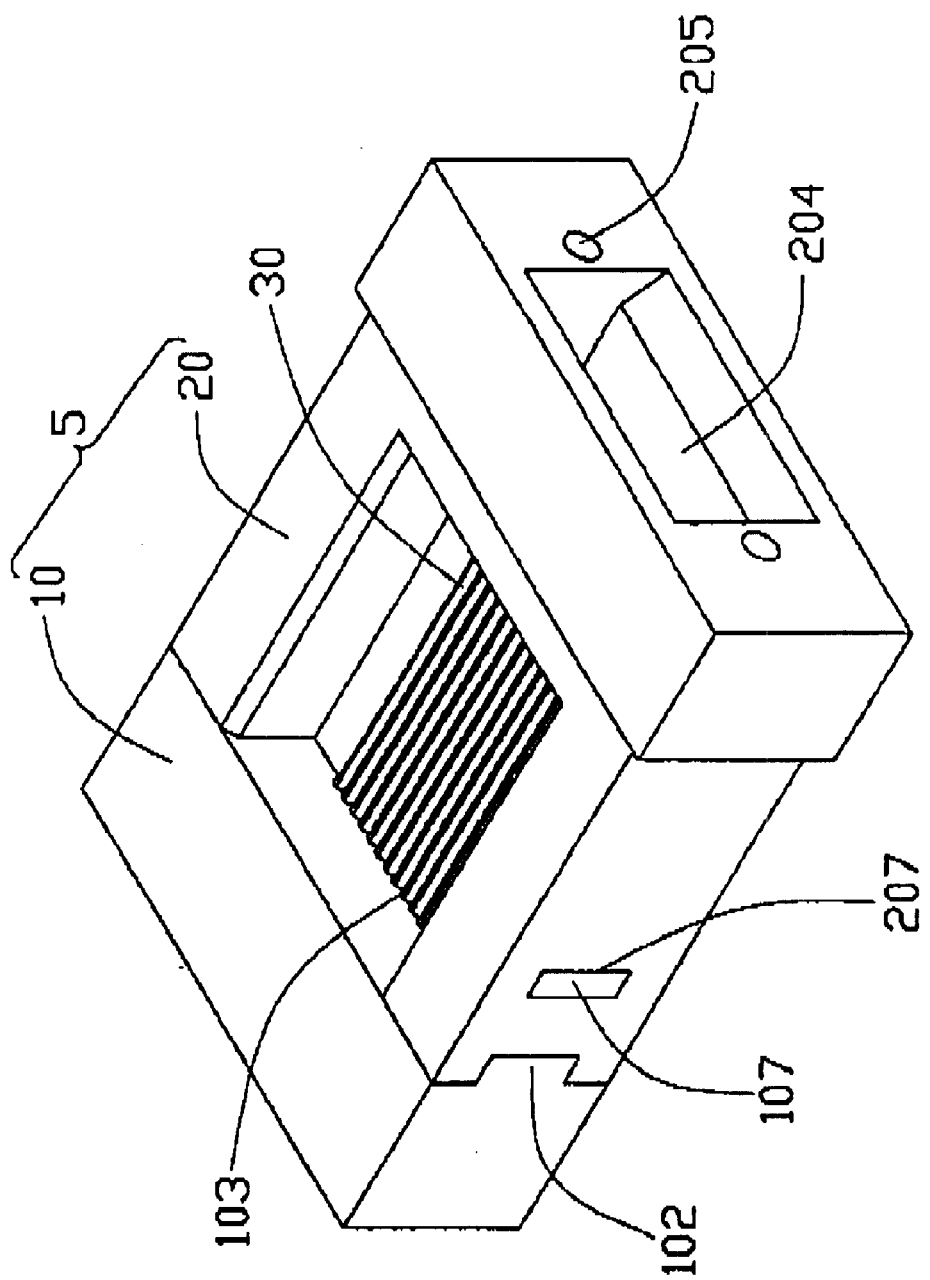
FIG. 2 is an assembled view of the multi-fiber ferrule of FIG. 1.
Figure 3:
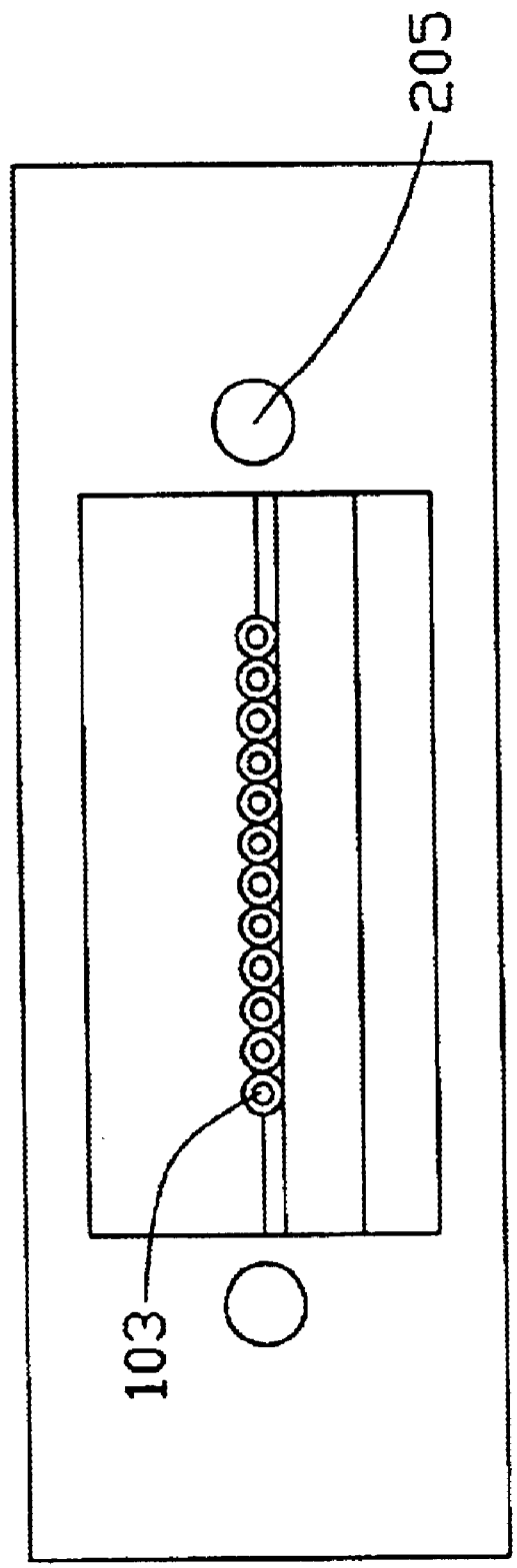
FIG. 3 is a front view of the multi-fiber ferrule of FIG. 2.

As shown in FIGS. 1, 2, and 3, a multi-fiber ferrule 5 comprises a ceramic body 10 and a housing 20 for connecting with the ceramic body 10.

The ceramic body 10 has a rectangular portion 101 and two opposing latches 102 extending from a front face (not labeled) of the rectangular portion 101. A pair of guide pin channels 105 is defined in the rectangular portion 101 between the two opposing latches 102. A plurality of through holes 103 is defined through the rectangular portion 101 between the two guide pin channels 105. Each latch 102 defines a recess 106 and has a key 107.

The plastic housing 20 is formed by insert molding and is generally in the shape of a block. The housing 20 defines a cavity 201, a passageway 204 communicating with the cavity 201 for inserting fibers therethrough, and a pair of guide pin channels 205. A plurality of V-grooves 203 for mounting fibers (not shown) therein are defined in a floor (not labeled), which floor delimits a lower boundary of the cavity 201. Two notches 207, two indentations 208 and two ribs 206 are formed on both sides of the housing, respectively.

In assembly, the ceramic body 10 is fixed to a tailor-made mold (not shown), liquid plastic is inserted into the mold, and is thereafter cooled to form the housing 20 integrally secured to the ceramic body 10. The plurality of V-grooves 203 in the housing 20 align with the through holes 103 of the ceramic body 10. The guide pin channels 205 of the housing 20 align with the guide pin channels 105 of the ceramic body 10. The keys 107 and the recesses 106 of the ceramic body 10 engage with the notches 207 and ribs 206 of the housing 20, respectively.

In use, fibers are inserted into the multi-fiber ferrule 5 through the passageway 204 of the housing 20. Portions of the fibers which have been stripped of their outer coating are mounted in the V-grooves 203 using adhesive material, and extend into the through holes 103. A guide pin (not shown) is received in each pair of aligned guide pin channels 105, 205 to aid alignment with other optical devices.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A multi-fiber ferrule assembly, comprising:
   a ceramic body comprising a plurality of through holes defined therethrough for holding the fibers and, two first guide pin channels therethrough for receiving guide pins to aid in mating with another optical device and at least a locking element; and
   a housing with at least a coupling element mated with the locking element of the ceramic body, a plurality of grooves being defined in the housing, each groove aligning with a corresponding through hole of the ceramic body;
   wherein the plurality of optical fibers are mounted in the grooves and extend into the aligned corresponding through holes, respectively.

2. The multi-fiber ferrule assembly as claimed in claim 1, wherein the housing further defines a cavity and a passageway communicating with the cavity, the plurality of grooves being formed in a floor which forms a lower boundary of the cavity.

3. The multi-fiber ferrule assembly as claimed in claim 2, wherein the housing further defines two second guide pin channels aligning with the two first guide pin channels of the ceramic body.

4. The multi-fiber ferrule assembly as claimed in claim 3, further comprising a pair of guide pins, each guide pin being received in a corresponding first and second guide pin channels.

5. The multi-fiber ferrule assembly as claimed in claim 1, wherein the housing is made of plastic and is formed using insert molding.

6. The multi-fiber ferrule assembly as claimed in claim 1, wherein the ceramic body further comprises two opposing latches extending therefrom.

7. The multi-fiber ferrule assembly as claimed in claim 6, wherein the housing further defines two notches for engaging with the latches of the ceramic body, said two notches respectively running through two side walls of the housing.

8. A multi-fiber ferrule for use with a plurality of optical fibers, comprising:
   a ceramic body defining a plurality of through holes for holding fibers and two first guide pin channels;
   a pair of guide pins; and
   a housing integrally secured with the ceramic body, the housing defining two second guide pin channels aligning with the two first guide pin channels, and a plurality of grooves formed in the housing, each groove aligning with a corresponding through hole,
   wherein each guide pin is received in a corresponding first and second guide pin channels to aid in mating with another optical device.

9. The multi-fiber ferrule as claimed in claim 8, wherein the ceramic body further comprises two opposing latches extending therefrom.

10. The multi-fiber ferrule as claimed in claim 9, wherein the housing further defines two notches for engaging with the latches of the ceramic body, said two notches respectively running through two side walls of the housing.

11. The multi-fiber ferrule as claimed in claim 8, wherein the housing further defines a cavity and a passageway communicating with the cavity, the passageway being defined between the two guide pin channels of the housing, the grooves being formed in a floor making a bottom boundary of the cavity.

12. A multi-fiber ferrule for use with a plurality of optical fibers, comprising:
   a high precision ceramic body defining a plurality of through holes side by side extending in a horizontal direction;
   a housing fixedly insert-molded with said ceramic body and defining a plurality of grooves side by side extending in said horizontal direction respectively and aligned with the corresponding through holes in said horizontal direction and having a same pitch with the through holes; and
   said grooves are upwardly exposed to an exterior in a vertical direction perpendicular to said horizontal direction.

* * * * *